United States Patent [19]

Hashimoto et al.

[11] 4,183,902
[45] Jan. 15, 1980

[54] WET PROCESS FOR REMOVING SPECIFIC COMPONENT FROM GAS

[75] Inventors: Noboru Hashimoto, Yokohama; Teizo Senjo, Machida; Makio Kobayashi, Toyonaka, all of Japan

[73] Assignees: JGC Corporation; Fuji Kasui Engineering Co., Ltd., both of Tokyo; Sumitomo Metal Industries, Ltd., Osaka, all of Japan

[21] Appl. No.: 915,080

[22] Filed: Jun. 13, 1978

[51] Int. Cl.$^2$ .............................................. B01D 53/34
[52] U.S. Cl. ................... 423/210; 423/215.5; 423/235; 423/238; 423/242; 55/68; 55/73; 55/90
[58] Field of Search ............... 423/210, 242 A, 235, 423/238, 215.5; 55/84, 87, 90, 68, 73; 261/113

[56] References Cited

U.S. PATENT DOCUMENTS

| | | | |
|---|---|---|---|
| 194,299 | 8/1877 | Genth | 423/238 |
| 3,718,731 | 2/1973 | Carlson et al. | 423/238 |
| 3,892,837 | 7/1975 | Uchiyama et al. | 423/242 A |
| 3,941,572 | 3/1976 | Uchiyama et al. | 55/90 |
| 3,969,482 | 7/1976 | Teller | 423/235 |
| 4,086,324 | 4/1978 | Welty, Jr. | 423/235 |

OTHER PUBLICATIONS

Varoczy, "A Systemic Correlation for Two-Phase Pressure Drop," Chemical Engineering Process Progress Symposium Series, vol. 62, No. 64, pp. 232–239.

Primary Examiner—Earl C. Thomas
Attorney, Agent, or Firm—Armstrong, Nikaido, Marmelstein & Kubovcik

[57] ABSTRACT

Disclosed is a wet process for efficiently and economically removing a specific gas component and/or solid component from a gas containing the same wherein the gas is countercurrently contacted with a scrubbing liquid in a perforated or grid plate column without weir and downcomer and having a free-space ratio of 0.30 to 0.60 under the conditions of a superficial gas velocity of from 1.5 to 8 m/sec and a liquid flow rate of from more than 110,000 to 250,000 kg/m$^2$·hr.

11 Claims, 2 Drawing Figures

WET PROCESS FOR REMOVING SPECIFIC COMPONENT FROM GAS

BACKGROUND OF THE INVENTION

1. Field of the Invention

The present invention relates to a wet process for removing a specific component from a gas containing the same. More specifically, it relates to a wet process for removing a specific component such as a specific gas component or a specific solid particle from a gas containing the same by using a scrubbing column provided with at least one Moredana plate.

The term "Moredana plate" as used in this specification means a perforated plate or grid plate without weir and downcomer.

2. Description of the Prior Art

Typical wet processes for the removal of a specific component from a gas containing the same include, for example, those of the type wherein the gas to be treated is brought into countercurrent contact with a scrubbing liquid by means of a conventional perforated plate column provided with perforated plates having a free-space ratio of less than 0.30, a packed column, a spray scrubber, a bubble-cap tray column or the like.

However, the process employing a packed column has the following disadvantages: occurrences of channeling of liquid and gas streams in the packed column and occurrences of plugging or blocking in the packed column during operation when the gas or liquid contains solid materials, dust particles or the like. The process employing a spray scrubber has the following disadvantages: requirement of a large amount of power to spray the liquid, likely occurrence of liquid entrainment and an unsatisfactory absorption capacity.

The processes employing a plate column such as, for example, a bubble-cap tray column, a conventional perforated plate column and the like also have some disadvantages in that the pressure drop of the column is relatively high and the plate efficiency of the plate column is usually low. In addition, the superficial gas velocity in such plate column is generally limited to the range of from approximately 0.3 m/sec to approximately 2 m/sec in conventional scrubbing columns. Accordingly, in order to treat a large flow rate of gases, a large column is required. Therefore, the development of gas scrubbing processes having a high gas capacity has been eagerly desired in the industry.

In order to obviate the above-mentioned problems in the conventional gas scrubbing processes, two of the three inventors of the present invention have developed and proposed a process for removing a specific gas component and/or fine dust from gas comprising passing the gas containing the specific gas component and/or fine dust upwardly through a plate column comprising at least one perforated or grid plate without weir and downcomer and having a free-space ratio (Fc) of 0.25 to 0.60 at a superficial gas velocity falling within an undulation region, while passing a liquid absorbent downwardly through the plate column in a countercurrent flow relationship to the upflowing gas under a liquid-gas ratio (L/G) of 0.5 or more. This process is disclosed in Japanese Patent Publication No. 51-31036(1976) (published on Sept. 4, 1976) and U.S. Pat. No. 3,941,572 (issued on Mar. 2, 1976). The term undulation region mentioned above is also defined in the above publications. Stated in these publications are the following six equations for calculating Ugm (i.e., the minimum superficial gas velocity of the undulation region) and Ugc (i.e., the maximum superficial gas velocity of the undulation region) under a liquid flow rate of from 9,000 to 110,000 kg/m²·hr. Four of the six equations are as follows:

$$\frac{U_{gm}}{F_c \sqrt{gl}} = 49.14 F_c^{-0.30} \left(\frac{\rho g}{\rho l} \times 10^3\right)^{-0.5} \left(\frac{L}{G}\right)^{-\frac{1}{3}} \quad (1)$$

$$\frac{U_{gm}}{F_c \sqrt{gl}} = 40.92 F_c^{-0.30} \left(\frac{\rho g}{\rho l} \times 10^3\right)^{-1.535} \left(\frac{L}{G}\right)^{-\frac{1}{3}} \quad (2)$$

$$\frac{U_{gm}}{F_c \sqrt{gl}} = 67.8 \left(\frac{L}{G}\right)^{-0.23} \left(\frac{\rho g}{\rho l} \times 10^3\right)^{-0.576} \quad (3)$$

$$\frac{U_{gm}}{F_c \sqrt{gl}} = 76.7 \left(\frac{L}{G}\right)^{-0.23} \left(\frac{\rho g}{\rho l} \times 10^3\right)^{-1.255} \quad (4)$$

wherein
 g = gravitational acceleration (m/sec²)
 Fc = free-space ratio of perforated plate and grid plate ( − )
 L = liquid flow rate (kg/m² sec)
 G = gas flow rate (kg/m² sec)
 $\rho l$ = liquid density (kg/m³)
 $\rho g$ = gas density (kg/m³)
 $l = \sqrt{2\sigma/g\rho l}$ = capillary constant (m)
 $\sigma$ = surface tension (kg/sec²)

The above equation (1) is applicable to the perforated plate in the case of $$F_c \geq 0.16 \text{ and } \rho g/\rho l \times 10^3 \geq 0.838,$$

and the equation (2) is applicable to the perforated plate in the case of $$F_c \geq 0.16 \text{ and } \rho g/\rho l \times 10^3 \leq 0.838,$$

the equations (3) and (4) are applicable to perforated plate (Fc ≤ 0.16) and grid plate, when $$\rho g/\rho l \times 10^3 \geq 1.20 \text{ and } \rho g/\rho l \times 10^3 \leq 1.20,$$

respectively.

The remaining two equations are as follows:

$$U_{gc}/U_{gm} = 7.509 \times 10^2 \times L^{-0.5704} \quad (5)$$

$$U_{gc}/U_{gm} = 3.434 \times L^{-0.0807} \quad (6)$$

wherein L is the same in equations (1) through (4).

The above equations (5) and (6) are applicable to the perforated or grid plate, when $L = 6 \times 10^4 \sim 11 \times 10^4$ kg/m²·hr and $L = 10^4 \sim 6 \times 10^4$ kg/m²·hr, respectively.

The above-mentioned problems of the conventional gas scrubbing processes can be obviated to some extent by contacting a gas with a scrubbing liquid under the conditions of a superficial gas velocity being within the range of from Ugm to Ugc and a liquid flow rate being within the range of from 9,000 to 110,000 kg/m²·hr according to the process proposed above. However, this process is still insufficient in terms of being used as practical industrial processes, especially in the case where a large amount of a scrubbing liquid, for example, 110,000 kg/m²·hr or more is used. For instance, 110,000 kg/m²·hr or more of a scrubbing liquid are required for industrial processes in the case where a high content (e.g. 1000 ppm or more) of sulfur oxides present in a waste gas is treated with a scrubbing liquid containing calcium carbonate.

SUMMARY OF THE INVENTION

Accordingly, an object of the present invention is to obviate the above-mentioned problems of the conventional processes and to provide a process which is capable of removing a specific gas component and/or solid component from a gas with a high degree of efficiency and which is capable of treating such gas with a scrubbing liquid at very increased gas flow rate and at a liquid flow rate of more than 110,000 kg/m$^2$·hr to 250,000 kg/m$^2$·hr.

Other objects and advantages of the present invention will be apparent from the following description.

In accordance with the present invention, there is provided a process for removing a specific component from a gas containing the same which comprises passing the gas upwardly through a scrubbing column provided with at least one perforated or grid plate without weir and downcomer, such plate having a free-space ratio (Fc) in the range of from 0.30 to 0.60, and passing the gas through the column at a superficial gas velocity within a range of from 1.5 to 8.0 m/sec, and simultaneously passing a scrubbing liquid downwardly through the column at a liquid flow rate of more than 110,000 kg/m$^2$·hr to 250,000 kg/m$^2$·hr.

DESCRIPTION OF THE PREFERRED EMBODIMENTS

The term "free-space ratio" as used herein is defined as the ratio of the total hole or slit area (m$^2$) of a plate to the cross-sectional area (m$^2$) of the column. The term "superficial gas velocity" as used herein is defined as the ratio of the actual gas flow rate (m$^3$/sec) to the column cross-sectional area (m$^2$). The unit of the superficial gas velocity is "m/sec".

The operating or working zone of the present invention as well as that of the process disclosed in Japanese Patent Publication No. 51-31036(1976) (this process is hereinafter called the "former process") will be illustrated in detail with reference to the accompanying drawings. However, the present invention is not intended to be limited by these drawings.

In FIGS. 1 and 2, $\rho g$ (i.e., gas density) is 1.05 kg/m$^3$, and $\rho l$ (i.e. liquid density) is 1070 kg/m$^3$ in FIG. 1 and 1000 kg/m$^3$ in FIG. 2.

Figure 1:
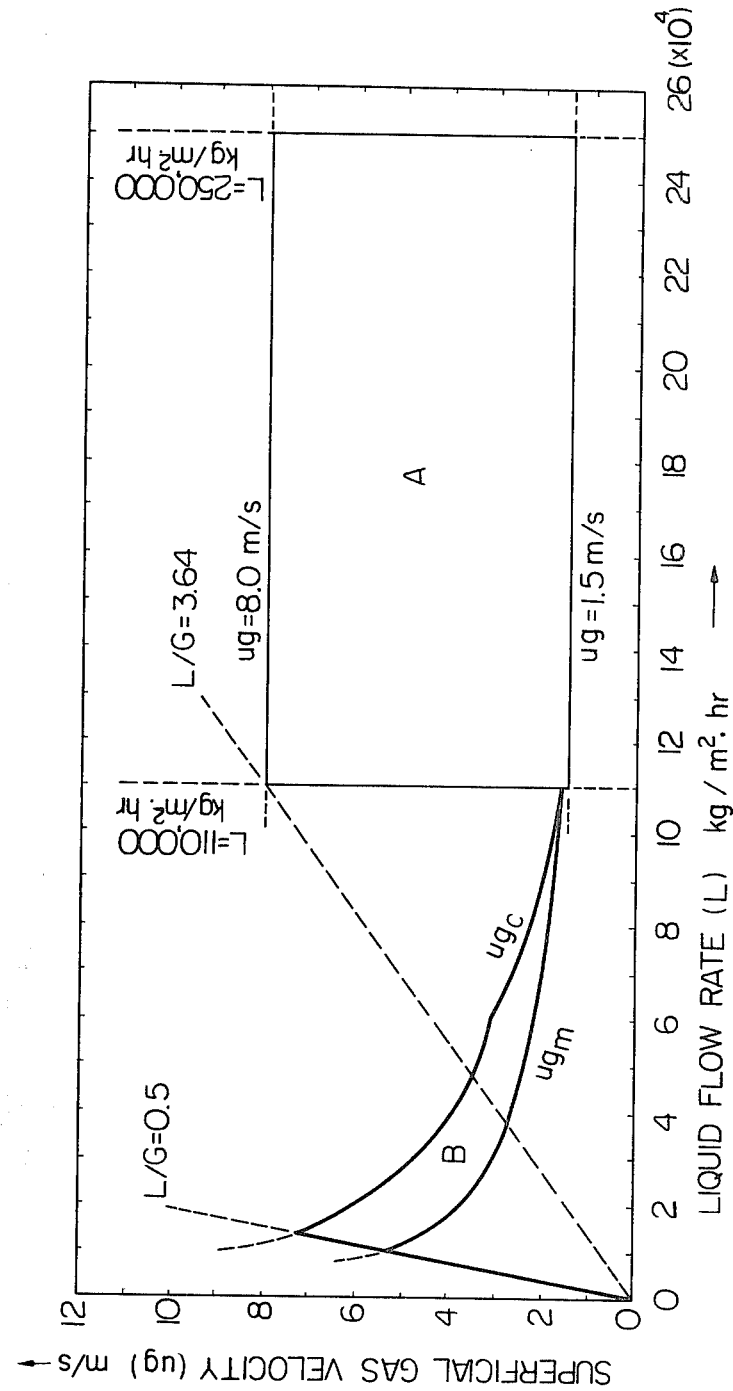
FIG. 1 is a graphical drawing showing the operating zones of the present invention and the former process in the case of a perforated plate having an Fc of 0.32.
Figure 2:
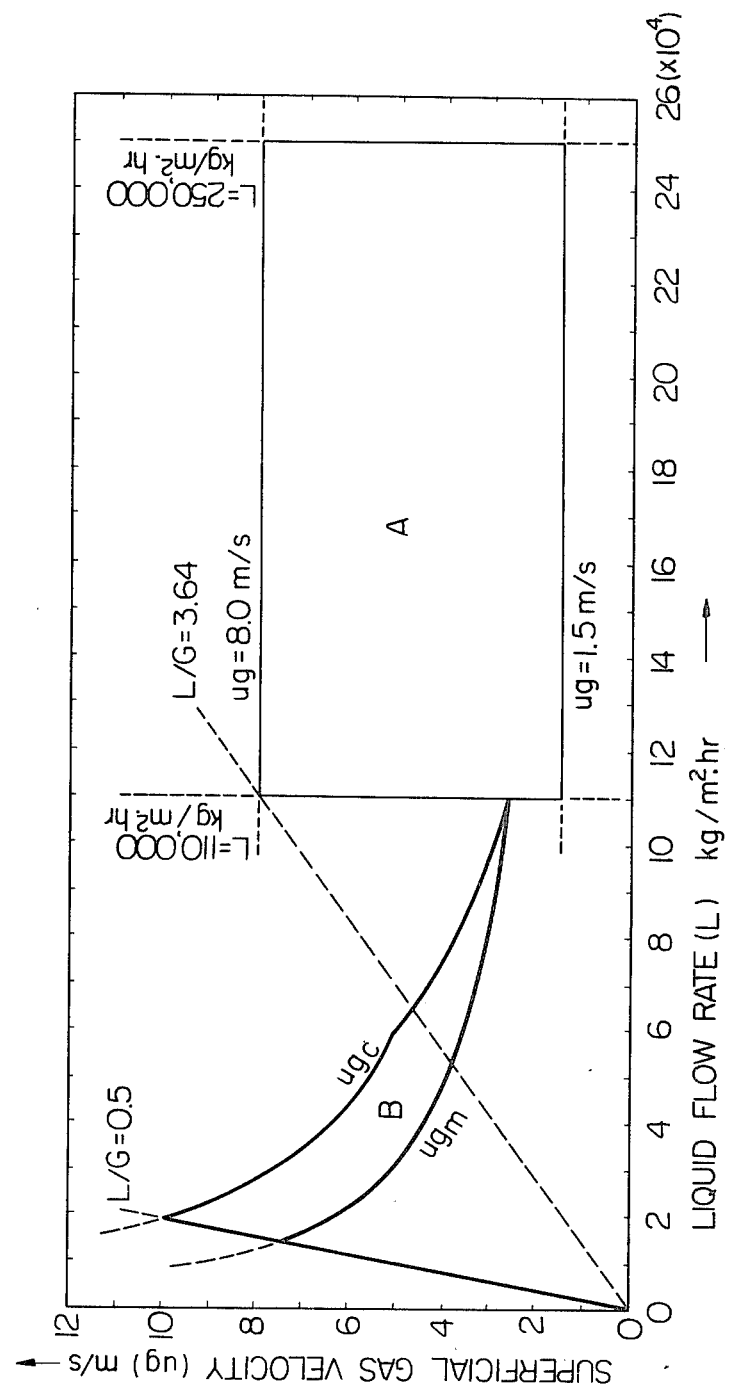
FIG. 2 is a graphical drawing showing the operating zones of the present invention and the former process in the case of a perforated plate having an Fc of 0.52.

As shown in FIGS. 1 and 2, zone A, i.e., the operating zone of the present invention, is clearly distinguishable from zone B, i.e., the operating zone of the former process. That is to say, the operating zone of the former process is limited to a liquid flow rate range of from 9000 to 110,000 kg/m$^2$·hr, whereas the liquid flow rate of the process of the present invention is limited to the range of from more than 110,000 to 250,000 kg/m$^2$·hr, and more preferably, within the range of from more than 110,000 to 230,000 kg/m$^2$·hr, which range is larger than that of the former process. The operating zone of the present invention (i.e., zone A) is heretofore not known. It has now been found that, when a gas to be treated is countercurrently contacted with a scrubbing liquid, under the conditions falling within the zone A, in a Moredana plate column having a free-space ratio of from 0.30 to 0.60, a specific gas component and/or solid component present in the gas can be effectively and efficiently removed from the gas without causing any rapid increase in the pressure drop of the plate.

The liquid-gas contact apparatus to be employed in the present invention includes a scrubbing column comprising at least one perforated plate or grid plate having no weir and no downcomer and having a free-space ratio of from 0.30 to 0.60, and more preferably, of from 0.32 to 0.52. The plate number of the scrubbing column is generally from 1 to 7, and more preferably, from 3 to 5, and the space of the plates in the column is generally 0.3 to 1.5 m, and more preferably, from 0.5 to 1.2 m. Although no particular dimension of the hole or slit in the plate is required, the hole diameter or slit width is generally selected from the range of from 4 to 30 mm. The diameter of the scrubbing column to be employed in the present invention is preferably 300 mm or more, and more preferable 500 mm or more. Furthermore, there is no critical upper limit to the diameter of the scrubbing column. In fact, a scrubbing column having a diameter of approximately 10.3 m has been satisfactorily utilized in a Practical situation.

When the free-space ratio of the plate is less than 0.30, the superficial gas velocity in the column is unpreferably limited to less than 3 m/sec due to the fact that the pressure drop of gas through the plate becomes high. This limitation of the superficial gas velocity causes the scrubbing column to be undesirably enlarged for any practical use. Contrary to this, when the free-space ratio of the plate is more than 0.60, the plate efficiency unpreferably decreases due to the reduction of the amount of liquid hold up on the plate. It is also difficult from an industrial point of view to manufacture a plate having a free-space ratio of more than 0.6.

According to the present invention, the liquid flow rate of a scrubbing liquid is generally within the range of from more than 110,000 kg/m$^2$·hr to 250,000 kg/m$^2$·hr, and more preferably, within the range of from more than 110,000 to 230,000 kg/m$^2$·hr. When the liquid flow rate of the scrubbing liquid is more than 250,000 kg/m$^2$·hr, the gas pressure drop in a column becomes relatively high and a substantial amount of the scrubbing liquid is also unpreferably entrained in the treated gas.

According to the present invention, the superficial gas velocity Ug is generally selected from within the range of from 1.5 to 8.0 m/sec, as shown in FIGS. 1 and 2, and more preferably, within the range of from 2.4 to 6.0 m/sec. When the superficial gas velocity is less than 1.5 m/sec, the plate efficiency decreases due to the reduction of the amount of liquid hold up caused by the low gas velocity. Contrary to this, when the superficial gas velocity is greater than 8.0 m/sec, not only is the pressure drop of the plate unpreferably increased, but also the scrubling liquid tends to be entrained in the treated gas. Under these conditions, a stable continuous operation cannot be effected.

Since the gas flow rate and the liquid flow rate are clearly defined in the present invention, it will be appreciated by those skilled in the art that a liquid to gas flow ration (L/G) can be determined from the given superficial gas velocity and the given liquid flow rate, depending on the density of the gas to be treated. The liquid to gas flow ratio (L/G) of the present invention is usually 3.0 or more, and more preferably, in the range of from 4 to 17.

According to the present invention, waste gases containing at least one harmful gas and/or solid component selected from the group consisting of sulfur oxides, nitrogen oxides and/or dust particles can be treated. Waste gases containing various odors or smelly components as well as coke oven gases containing acidic components and/or ammonia gas can also be treated according to the present invention. The present invention can be further applied to the case where other types of gas components and/or solid components contained in a gas must be removed. When gases are heated or cooled, the present invention can be utilized due to the fact that the efficiency of the gas-liquid contact of the present invention is very high.

The scrubbing or treating liquid to be used in the present invention can include any conventional scrubbing solutions or suspensions, any conventional absorbing solutions or suspensions and any aqueous solutions or emulsions. For instance, when a gas containing sulfur oxides and/or nitrogen oxides is treated, an aqueous solution or suspension containing, as an absorbing agent, the hyroxide of alkali metals, alkaline earth metals or ammonia such as sodium hydroxide, potassium hydroxide, calcium hydroxide, magnesium hydroxide or ammonium hydroxide; the carbonate of alkali metals, alkaline earth metals or ammonia such as sodium carbonate, potassium carbonate, calcium carbonate, magnesium carbonate or ammonium carbonate; the sulfite of alkali metals, alkaline earth metals or ammonia such as sodium sulfite, potassium sulfite, calcium sulfite, magnesium sulfite or ammonium sulfite; or the like can be used as the scrubbing liquid. An aqueous ammonia solution can be used for removing acidic gas components such as hydrogen sulfide from, for example, a coke oven gas. In addition, in the case where ammonia contained in a gas is removed, an aqueous solution containing sulfuric acid, phosphoric acid, carbolic acid, acetic acid, oxalic acid, ammonium hydrogenphosphate or the like can be used. When a gas containing solid particles such as fine dust or soot is treated, water or water containing any conventional surface active agent can be used for physically removing the solid particles. When the solid particles are removed from a gas simultaneously with, for example, sulfur oxides and/or nitrogen oxides, the above-mentioned scrubbing or absorbing liquid for removing sulfur oxides and/or nitrogen oxides can also act as a scrubbing liquid for the solid particles.

The present invention will be further illustrated by the following Examples. However, it is noted that the present invention is by no means limited to such Examples.

EXAMPLE 1

Air was brought into a countercurrent contact with water under the various conditions listed in Table 1 below by using a "Moredana" scrubbing column having a diameter of 5600 mm and provided with four perforated plates without weir and downcomer. The free-space ratio (Fc) of the plates used was 0.32 or 0.52. The water content of the exhaust air from the column, the total pressure drop of the four plates and the superficial gas velocity in the column were measured under stable operating conditions. From the measurement of the water content of the exhaust air, a ratio of the amount of the water contained in the exhaust air to the amount of the water charged into the column was calculated. The results are shown in Table 1.

Table 1

| Run No. | 1 | 2 | 3 | 4 | 5 | 6 |
|---|---|---|---|---|---|---|
| Flow rate of water charged into column (kg/cm$^2$ · hr) | $12.2 \times 10^4$ | | $1.6 \times 10^4$ | | $18.0 \times 10^4$ | |
| Free-space ratio (Fc) of plates | 0.32 | 0.52 | 0.32 | 0.52 | 0.32 | 0.52 |
| Ratio of amount of water contained in exhaust air to amount of water charged into column (kg/kg) | 0.07 | 0.08 | 0.10 | 0.11 | 0.24 | 0.25 |
| Total pressure drop of four plates (mmH$_2$O) | 190 | 203 | 230 | 234 | 290 | 300 |
| Superficial gas velocity (m/sec) | 4.5 | 8.0 | 4.5 | 8.0 | 4.5 | 8.0 |

In addition, it was observed from further operations that gas is preferably treated with liquid under the conditions wherein the superficial gas velocity is from 2 to 8 m/sec and the liquid flow rate is from 11,000 to 170,000 kg/m$^2$·hr for effecting more stable operations.

EXAMPLE 2

95000 m$^3$/hr of exhaust gas from a boiler containing 1700 ppm of SO$_2$ were continuously introduced into the bottom portion of a Moredana scrubbing column having a diameter of 2900 mm and provided with four perforated plates without weir and downcomer. The free-space ratio (Fc) of the perforated plates was 0.52 and the diameter of holes of each of the plates was about 10 mm. 230,000 kg/m$^2$·hr of an aqueous absorbing liquid containing 0.15 g/liter of calcium carbonate (CaCO$_3$) were simultaneously fed into the top portion of the scrubbing column, whereby the gas containing SO$_2$ was brought into countercurrent contact with the aqueous absorbing liquid containing CaCO$_3$. The superficial gas velocity in the column was 4.0 m/sec and the ratio of the liquid flow rate L to the gas flow rate G (L/G) was 16 kg/kg.

From the measurement of the SO$_2$ content of the treated off-gas, the desulfurization efficiency was determined to be 98%. The total pressure drop of the four plates was 180 mm H$_2$O.

EXAMPLE 3

600,000 m$^3$/hr of exhaust gas from a furnace for sintering iron ore were continuously fed into the bottom portion of a Moredana scrubbing column having a diameter of 10.3 m and provided with two perforated plates without weir and downcomer, while 115,000 kg/m$^2$·hr of an aqueous absorbing liquid having a pH of 6.0 and containing calcium carbonate (CaCO$_3$) were also continuously fed into the top portion of the scrubbing column. The free-space ratio (Fc) of the perforated plates was 0.31 and the hole diameter of each of the perforated plates was about 8.5 mm. The gas containing SO$_2$ was brought into countercurrent contact with the downflowing aqueous absorbing liquid containing CaCO$_3$, whereby SO$_2$ containe in the gas was removed from the gas. The superficial gas velocity in the column was 2.0 m/sec and the ratio of the liquid flow rate L to the gas flow rate G (L/G) was 16 (kg/kg).

From the measurement of the SO$_2$ content of the treated off-gas, the desulfurization efficiency was determined to be 93%. The total pressure drop of two plates was 65 mm H$_2$O.

EXAMPLE 4

Simulated gas containing approximately 2.4 g/Nm³ of dust having an average diameter of 5.6 microns and a true specific gravity of 3.3 g/cm³ was continuously introduced into bottom portion of a Moredana scrubbing column having a diameter of 500 mm and provided with three perforated plates without weir and downcomer. The free-space ratio (Fc) of each plate was 0.34, and the hole diameter of the plate was about 8 mm. Into the top portion of the Moredana column, 123,000 kg/m² hr of water were simultaneously introduced, whereby the gas containing dust was countercurrently contacted with water. The superficial gas velocity in the column was 3.73 m/sec, and the liquid-gas ratio (L/G) was 7.7 (kg/kg).

From the measurement of the dust content of the treated off-gas, the rate of the dust removal was determined to be 92%. The pressure drop of the plate was 125 mm $H_2O$. In addition, it was observed that only a little entrainment of water in the off-gas occurred.

EXAMPLE 5

408,000 m³/hr of exhaust gas from a boiler containing 1275 ppm of $SO_2$ were continuously fed into the bottom portion of a Moredana scrubbing column having a diameter of 5600 mm and provided with four perforated plates. The free-space ratios of the plates were 0.40, 0.32, 0.32 and 0.38 from the bottom. On the other hand 130,000 kg/m²·hr of an aqueous absorbing liquid containing 0.08 mol/liter of calcium carbonate ($CaCO_3$) were simultaneously fed into the top portion of the column, whereby the gas containing $SO_2$ was brought into countercurrent contact with the aqueous absorbing liquid containing $CaCO_3$. The superficial gas velocity in the column was 4.9 m/sec, and the liquid-gas flow ratio (L/G) was 7.0 (kg/kg). From the measurement of the $SO_2$ content of the treated exhaust gas, i.e., off-gas, the desulfurization efficiency (i.e., $SO_2$ removal percent) was determined to be 93.3% on the average. The total pressure drop of the four plates was 195 mm $H_2O$. It was further observed that only a little entrainment of the absorbing liquid occurred and a stable operation could be continued for a long period of time.

EXAMPLE 6

350,000 m³/hr of exhaust gas from a boiler containing 1510 ppm of $SO_2$ were continuously fed into the bottom portion of a Moredana scrubbing column having a diameter of 6600 mm and provided with four perforated plate. The free-space ratios of the plates were 0.32, 0.32, 0.32, 0.32 and 0.35 from the bottom. On the other hand 126,000 kg/m²·hr of an aqueous absorbing liquid containing 0.08 mol/liter of calcium carbonate ($CaCO_3$) were simultaneously fed into the top portion of the column, whereby the gas containing $SO_2$ was brought into countercurrent contact with the aqueous absorbing liquid containing $CaCO_3$. The superficial gas velocity in the column was 2.84 m/sec, and the liquid-gas flow ratio (L/G) was 11.7 (kg/kg). From the measurement of the $SO_2$ content of the treated exhaust gas, i.e., off-gas, the desulfurization efficiency (i.e., $SO_2$ removal percent) was determined to be 98.0% on the average. The total pressure drop of the four plates was 199 mm $H_2O$. It was further observed that only a little entrainment of the absorbing liquid occurred and a stable operation could be continued for a long period of time.

What we claim is:

1. In a process for removing a specific component from a gas containing the same which comprises passing said gas upwardly through a scrubbing column provided with at least one perforated or grid plate without weir and downcomer and having a free-space ratio (Fc) in the range of from 0.30 to 0.60, and simultaneously passing a scrubbing liquid downwardly through the column, the improvement wherein (a) a superficial gas velocity of said gas is within the range of from 1.5 to 8 m/sec and (b) a liquid flow rate (L) of said scrubbing liquid is more than 115,000 kg/m²·hr and not more than 250,000 kg/m²·hr.

2. A process as claimed in claim 1, wherein said scrubbing column comprises three to five perforated or grid plates without weir and downcomer, the space of the plates being within the range of from 0.5 to 1.2 m.

3. A process as claimed in claim 1, wherein the upper limit of the superficial gas velocity is 6 m/sec.

4. A process as claimed in claim 1, wherein said gas is a waste gas containing at least one harmful component selected from the group consisting of sulfur oxides, nitrogen oxides and dust particles.

5. A process as claimed in claim 1, wherein said gas is a coke oven gas containing an acidic gas component, ammonia gas or a mixture thereof.

6. A process as claimed in claim 1, wherein said scrubbing liquid is an absorbing liquid which chemically absorbs the specific component present in the gas.

7. A process as claimed in claim 6, wherein said absorbing liquid is an aqueous solution or suspension containing at least one absorbing agent for sulfur oxides and/or nitrogen oxides selected from the group consisting of sodium hydroxide, sodium carbonate, potassium hydroxide, potassium carbonate, magnesium hydroxide, magnesium carbonate, calcium hydroxide and calcium carbonate.

8. A process as claimed in claim 6, wherein said absorbing liquid is an aqueous ammonia for absorbing the acidic gas component.

9. A process as claimed in claim 6, wherein said absorbing liquid is an aqueous solution of at least one absorbing agent for ammonia selected from the group consisting of sulfuric acid, phosphoric acid, carbolic acid, acetic acid, oxalic acid and ammonium hydrogenphosphate.

10. A process as claimed in claim 1, wherein said scrubbing liquid is water or water containing a surface active agent for physically removing the specific component from the gas.

11. A process as claimed in claim 10, wherein said specific component is dust particles.

* * * * *